United States Patent
Rosenbaum

(10) Patent No.: US 10,269,190 B2
(45) Date of Patent: *Apr. 23, 2019

(54) SYSTEM FOR ANALYZING OPERATION CHARACTERISTICS OF A VEHICLE DRIVER

(71) Applicant: Walter Steven Rosenbaum, Paris (FR)

(72) Inventor: Walter Steven Rosenbaum, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,307

(22) Filed: May 15, 2018

(65) Prior Publication Data

US 2018/0261021 A1 Sep. 13, 2018

Related U.S. Application Data

(60) Division of application No. 15/807,885, filed on Nov. 9, 2017, now Pat. No. 9,990,782, which is a continuation of application No. 14/630,257, filed on Feb. 24, 2015, now Pat. No. 9,830,748, which is a continuation of application No. 13/861,989, filed on Apr. 12, 2013, now abandoned.

(60) Provisional application No. 61/624,016, filed on Apr. 13, 2012.

(51) Int. Cl.
| | |
|---|---|
| *G07C 5/00* | (2006.01) |
| *G07C 5/08* | (2006.01) |
| *G01C 21/28* | (2006.01) |
| *G06F 17/00* | (2019.01) |
| *G06Q 40/08* | (2012.01) |

(52) U.S. Cl.
CPC ............. *G07C 5/008* (2013.01); *G01C 21/28* (2013.01); *G06F 17/00* (2013.01); *G06Q 40/08* (2013.01); *G07C 5/085* (2013.01); *G07C 5/0808* (2013.01); *G07C 5/0858* (2013.01)

(58) Field of Classification Search
CPC .... G07C 5/008; G07C 5/0808; G07C 5/0858; G01C 21/28; G06Q 40/08
See application file for complete search history.

(56) References Cited

U.S. PATENT DOCUMENTS

| | | |
|---|---|---|
| 2,797,134 A | 6/1957 | Fuller |
| 5,797,134 A | 8/1998 | McMillan et al. |
| 6,064,970 A | 5/2000 | McMillan et al. |
| 6,141,609 A * | 10/2000 | Herdeg .................. G07C 5/008 340/995.1 |
| 6,851,063 B1 | 2/2005 | Boyle et al. |
| 6,868,386 B1 | 3/2005 | Henderson et al. |

(Continued)

FOREIGN PATENT DOCUMENTS

| | | |
|---|---|---|
| EP | 0700009 B1 | 3/2001 |
| EP | 1557780 A1 | 7/2005 |

(Continued)

*Primary Examiner* — Thomas Ingram
(74) *Attorney, Agent, or Firm* — Laurence A. Greenberg; Werner H. Stemer; Ralph E. Locher

(57) ABSTRACT

A method analyzes characteristics of a vehicle driver, especially for insurance purposes. The method is performed by a cooperation of an analyzing vehicle system in a vehicle and a stationary processing unit remote from the vehicle. The analyzing vehicle system determines a driver operation characteristics parameter from the driving vehicle and sends the parameter to the stationary processing unit. The stationary processing unit derives a metric from that parameter as driver operation characteristics.

20 Claims, 4 Drawing Sheets

(56) References Cited

U.S. PATENT DOCUMENTS

| | | | |
|---|---|---|---|
| 8,416,067 B2* | 4/2013 | Davidson | G06Q 10/08 340/426.1 |
| 8,442,558 B2* | 5/2013 | Mader | H04W 4/029 455/456.4 |
| 8,510,200 B2* | 8/2013 | Pearlman | G09B 19/14 705/36 R |
| 8,892,451 B2 | 11/2014 | Everett et al. | |
| 2004/0210353 A1* | 10/2004 | Rice | G01C 21/26 701/1 |
| 2005/0256615 A1 | 11/2005 | Wang et al. | |
| 2006/0253307 A1* | 11/2006 | Warren | G06Q 40/08 705/4 |
| 2007/0225912 A1* | 9/2007 | Grush | G01C 21/20 701/469 |
| 2007/0257815 A1* | 11/2007 | Gunderson | G08G 1/16 340/903 |
| 2008/0065427 A1* | 3/2008 | Helitzer | G06Q 40/08 705/4 |
| 2008/0150683 A1* | 6/2008 | Mikan | G07C 9/00309 340/5.31 |
| 2008/0319665 A1* | 12/2008 | Berkobin | G07C 5/085 701/469 |
| 2009/0157566 A1* | 6/2009 | Grush | G01C 21/28 705/400 |
| 2009/0222338 A1* | 9/2009 | Hamilton, II | G06Q 30/02 705/14.1 |
| 2009/0318121 A1* | 12/2009 | Marumoto | G07C 5/008 455/414.1 |
| 2010/0003944 A1* | 1/2010 | Orr | G06F 1/3203 455/343.1 |
| 2010/0088163 A1* | 4/2010 | Davidson | G06Q 10/08 340/425.5 |
| 2010/0129064 A1* | 5/2010 | Maeda | G07C 5/0891 386/241 |
| 2010/0201505 A1 | 8/2010 | Honary et al. | |
| 2010/0251148 A1* | 9/2010 | Brown | F41G 3/32 715/764 |
| 2010/0299055 A1* | 11/2010 | Hilbrandie | G01C 21/32 701/532 |
| 2011/0106370 A1* | 5/2011 | Duddle | G06Q 40/08 701/31.4 |
| 2011/0112969 A1* | 5/2011 | Zaid | G06Q 10/02 705/50 |
| 2011/0131238 A1 | 6/2011 | Peeters et al. | |
| 2012/0072244 A1* | 3/2012 | Collins | G06Q 10/10 705/4 |
| 2012/0088462 A1 | 4/2012 | Mader et al. | |
| 2012/0283893 A1* | 11/2012 | Lee | G07C 5/008 701/1 |
| 2012/0303254 A1* | 11/2012 | Kirsch | G07C 5/0808 701/123 |
| 2013/0006723 A1* | 1/2013 | McGowan, III | G08G 1/052 705/13 |
| 2013/0141249 A1 | 6/2013 | Pearlman et al. | |

FOREIGN PATENT DOCUMENTS

| | | |
|---|---|---|
| EP | 1921580 A1 | 5/2008 |
| FR | 2936631 A1 | 4/2010 |
| WO | 2010034909 A1 | 4/2010 |

* cited by examiner

SYSTEM FOR ANALYZING OPERATION CHARACTERISTICS OF A VEHICLE DRIVER

CROSS-REFERENCE TO RELATED APPLICATION

This application is a divisional of application Ser. No. 15/807,885, filed Nov. 9, 2017, which was a continuation of patent application Ser. No. 14/630,257, filed Feb. 24, 2015, now U.S. Pat. No. 9,830,748; which was a continuation, under 35 U.S.C. § 120, of copending patent application Ser. No. 13/861,989, filed Apr. 12, 2013; the application also claims the benefit, under 35 U.S.C. § 119(e), of provisional patent application No. 61/624,016, filed Apr. 13, 2012; the prior applications are herewith incorporated by reference in their entirety.

BACKGROUND OF THE INVENTION

Field of the Invention

The invention relates to a method for analyzing operation characteristics of a vehicle driver by means of an analyzing system, comprising an analyzing vehicle system and a stationary processing unit.

Description of the Related Art

Analyzing systems are known, for example, from FR2936631, U.S. Pat. No. 6,868,386, EP0700009B1, U.S. Pat. Nos. 5,797,134 and 6,064,970. Insurer rate models called Pay As You Drive (PAYD), which equated rates to mileage, have been around for some time. A more detailed Insurer rate model is called Pay How You Drive (PHYD). PHYD adds a direct monitoring of driver operation characteristics. None has met with notable success mainly because of costs, "Big-Brother" modes of monitoring and lack of obtainable clear actuarial inference fidelity.

SUMMARY OF THE INVENTION

It is an object of the invention to generate significant data about the operation of a vehicle in a simple manner. This object is solved by a method for analyzing operation characteristics of a vehicle driver, wherein a driver operation characteristics parameter is determined by an analyzing vehicle system in the vehicle, the parameter is sent to a stationary processing unit, and the stationary processing unit determines a driver operation characteristics. Two distinct systems cooperate: The analyzing vehicle system in the vehicle determines the driver operation characteristics parameter, and the stationary processing unit remote from the vehicle, determines the driver operation characteristics from this parameter. The analyzing vehicle system can be kept simple or can leverage on manufacturer supplied programmable units in the vehicle that contain requisite functionality.

Driver operation characteristics can be any information characterizing the driving of a vehicle driver. The driver operation characteristics parameter can be any parameter that describes operation characteristics of the vehicle driver, like location data indicating a route driven by the vehicle, vehicle speed, average speed, ratio of average speed against average speed limits, number and/or quantity of acceleration events within a predefined time span, or the like.

The vehicle may be a car. The stationary processing unit can be a server. The analyzing vehicle system preferably only contains elements which are within the vehicle when the vehicle is travelling.

The parameter or parameter data are sent from the analyzing vehicle system to the stationary processing unit. This can be done by packing parameter data in a data set, like a file, and sending the data set to the stationary processing unit. A data set can be a file, a data capsule, which can be a completed data package including all information to calculate operation characteristics of the driver, or the like.

In a preferred embodiment of the invention, the analyzing vehicle system comprises at least a first device and a second device, communicating with one another. Preferably one of the devices is base device fixed to the vehicle—called fixed device for convenience—and the other device is a mobile device which is location independent from the vehicle, like a portable device. The mobile device is preferably able to perform wireless remote information exchange, like a phone, especially any kind of a smart phone, a tablet computer, or the like. Both devices may be located independently in the vehicle and operate independently from one another. In the following, the two devices are the fixed device and the mobile device. However, the invention is not limited to this constellation, and the mobile device may be integrated in the fixed device creating a single device performing the method steps as described for the fixed device and the mobile device.

Both devices are part of the vehicle system inside the vehicle. The analyzing vehicle system is a part of an analyzing system which comprises the vehicle system and the stationary processing unit.

During operation, the analyzing vehicle system—or short: vehicle system—collects parameter data, like motion and driving related data. Each of these two devices carries software, preferably with a unique identification code—a mobile ID for the mobile device and a base ID for the fixed device—that is attached to data sets that they collect and that are transmitted to the stationary processing unit. The mobile ID may be an app identification and/or a driver identification and the base ID may be a vehicle identification and/or insurance contract identification.

The vehicle system can mirror the driving situation as the interaction of a specific car and a specific driver, with the mobile ID identifying the driver and the base ID identifying the vehicle. Several mobile devices may be assigned with the fixed device. The fixed device may comprise data which mobile ID is assigned to the base ID or fixed device respectively.

Each device may generate data sets including driver operation characteristics parameter data to be sent to the remote stationary processing unit. Each data set preferably includes the mobile ID and/or the base ID. With this, in a data set generated by the vehicle system it can be made obvious whether the vehicle is operated with proper system monitoring,
whether the driver is registered for this vehicle, and
in case of multiple registered drivers, which driver has been operating the car.

This approach enables the analyzing system to handle cases, such as a family vehicle or a car sharing operation, where multiple drivers use the same car, or cases where one person uses several different cars.

The mobile device may contain at least one processor, a memory, a means to communicate with the fixed device, a means to communicate with the stationary processing unit and an energy source, and preferably a location unit for generating location data of the mobile device, like a GPS unit. Further, the mobile device can be equipped with a software application called analyzing app, or app, in this context that is made for generating and processing driver operation characteristics parameter data.

In order to facilitate the connection between the fixed device and the mobile device, it is recommended that during vehicle operation the mobile device is placed in a holder or stand that is attached to the vehicle, preferably to the dashboard of the car. This will position the mobile device close to the fixed device, and, in case of multiple mobile devices in the vehicle, allows the fixed device to identify the driver's mobile device via the strongest signal. Otherwise the communicating antenna in the fixed device can be focused on the driver position to enhance that signal quality relative to other registered mobile devices in the vehicle.

The analyzing app may be software that can be installed on the mobile device and performs the collection and processing of parameter data. Preferably, it runs under all common smart phone operating systems. However, it is not restricted to those operating systems and can also be modified to run on other kinds of operating systems. The app manages the capture of parameter data, processing or-pre-processing, the storage organization, data encryption (if required) and the transmission of the data to the stationary processing unit for further processing.

The fixed device can be affixed to a surface of the vehicle, preferably the windshield. This can be done in a way that makes removal impossible without damaging the device. The fixed device may be prepared to perform one or any plurality of the following functions:

The fixed device is provided with a unique identification code (base ID) that can be attached to each data set transmitted to the stationary processing unit. Since the fixed device should not be removable from the vehicle this base ID can become the vehicle identification number.

Monitoring whether the fixed device is operated in conjunction with an analyzing app and registering the mobile ID code of this app. The mobile ID may also be attached to the data sets transmitted to the stationary processing unit. The combination of mobile ID and base ID can be used by the stationary processing unit to check whether the vehicle was operated according to predefined regulations, like insurance contract agreements.

Monitoring the mobile device battery charge, especially to identify low energy and prevent system failures due to low energy. In case of monitoring low battery charge information about the low battery charge is generated, which clearly distinguishes from information that no mobile device was found or only a mobile device without app.

With the aid of a motion detector and/or acceleration detector it generates parameter data, such as acceleration data, especially in case such data cannot or not reliably be monitored via the mobile device.

The fixed device may also have stored a plurality of mobile IDs including the information whether the respective ID is a primary ID or a secondary ID. A primary ID is a mobile ID of an app of a primary vehicle driver, which is a vehicle operator registered in a data base of the stationary processing unit as primary vehicle operator. A secondary ID is a mobile ID of an additional driver which may be registered as driver as well.

The fixed device may contain an energy source, an accelerometer or other motion detection means, a processor with attached memory, a means to communicate with the mobile device, preferably a Bluetooth set, and an energy source. The fixed device is constructed and fixed to the vehicle in such a way that removing the fixed device from its supporting surface after installation will permanently disrupt the internal mechanics of the device. This is made to prevent unauthorized tampering such as removal and affixing to another vehicle.

Further, to prevent tampering by removing the battery and thus disabling the fixed device, the following procedure can be employed:

A number of times each day which may be predefined and/or at random times during the day, the fixed device pulses to see if its battery is installed and if so battery confirmation data is generated. This data can be time stamped.

The battery confirmation data are stored in memory for later transfer, via the mobile device, to the stationary processing unit.

If the fixed device battery is removed surreptitiously, except momentarily, for example when replacement has been requested by the stationary processing unit, there will be time gaps in the battery confirmation data set containing successive battery confirmation data from multiple data polling. When the battery confirmation data set is transferred to the stationary processing unit, this gap is detected by the stationary processing unit and pinpoints misconduct.

During the operation of the vehicle system, preferably both, the mobile device and the fixed device are in operation, collecting and storing data and at intervals transmitting data between them. It is to be noted that in a preferred embodiment the operation of the system is non-discretionary. In a preferred embodiment, the fixed device records independent from driver intervention every driving event of the vehicle. The vehicle system operation starts and terminates without active interference from the driver. A start of the vehicle system may be triggered by vehicle motion and system termination by the prolonged lack of such motion. However, it is, of course possible to configure the system in such a way that the driver starts its operation. Further, the data collected by the vehicle system are not accessible for the driver which precludes tampering and fraudulent manipulation. No event based selection is made from these data before upload.

With the operation start, like upon the beginning of a movement of the vehicle, preferably one or any plurality of the following actions start:

A communication session between the fixed device and the mobile device,

Data collection of the driver operation characteristics parameter,

Copying parameter data from the fixed device to the mobile device,

Monitoring of the battery level of the mobile device by the fixed device.

To save energy during the driving of the vehicle, the communication session between the mobile device and the fixed device may be programmed to be intermittently terminated or put into sleep state and resumed during the driving of the vehicle. However, the collection of parameter data by at least the mobile device should continue after termination of communication. Resumption of the communication may be at random or predetermined intervals, preferably upon request by the fixed device. During such successive communication session, it might be sufficient to exchange only ID information and battery information to check whether the app is still the same and the power level is fine.

An example of such process could be as follows: The devices operate in a handshake protocol with multiple successive handshake processes, like at predefined instants of time, the communication is terminated after a handshake process and during movement of the vehicle. After such termination and before a start of a new communication session, both devices may operate independently from one another, wherein at least one device works in an analyzing mode collecting parameter data. On the other hand, at least one device—preferably the mobile device—would stop working in the analyzing mode if a handshake process fails at a predefined instant of time. Further, if a handshake fails, the fixed device may monitor a parameter of a movement of the vehicle, especially the duration of the movement, and stores parameter data together with the information that the handshake failed.

In a further embodiment of the invention the fixed device records a registration, like a mobile ID, and preferably password information from the mobile device. This information may be verified by the fixed device and/or by the stationary processing unit upon an upload to the stationary processing unit. Alternatively or additionally the mobile device may record an ID of the fixed device. This information may be verified by the mobile device and/or by the stationary processing unit upon an upload to the stationary processing unit. If the verification by the fixed device or the mobile device fails, the period of travel of the vehicle is recorded by the fixed device. This data may be sent to the stationary processing unit later.

Further, in case of failed registration and/or wrong password and possible communication of the fixed device with the mobile device, the characteristics parameter may be determined, especially in the same way as with registration and/or correct password, and sent to the stationary processing unit together with information about the failed registration and/or wrong password.

To prevent abuse or communication failure it is advantageous, if at least one of the devices checks a battery parameter, like energy level and/or absence of a battery signal, of the other device and stores battery parameter data. Those battery parameter data can be sent to the stationary processing unit later.

At certain intervals parameter data have to be transmitted from the mobile device to the stationary processing unit. The stationary processing unit can be a stationary processing unit of an insurance company connected to a storage medium containing records of multiple vehicle drivers associated with a given insured party and/or vehicle.

This data transfer to the stationary processing unit can be made via the mobile device, especially the mobile device of a primary driver. Several options exist for transmission routine. It may be triggered by the stationary processing unit contacting the mobile device. It may also be triggered by an internal routine of the analyzing app. In these cases the data transfer would not require any action from the operator. It is also possible that the stationary processing unit contacts the mobile device user, for example via SMS or email, and prompts him/her to upload the data. The upload itself can be made via the GSM network, or, less costly and more efficiently, via internet, either directly from the mobile device or via the mobile device user's PC connected directly or via Bluetooth or other wireless techniques.

An index for a successful data transfer is stored in the mobile device memory. Upon the next contact with the fixed device the fixed device reads this information and deletes the related backup files from the fixed device memory. This procedure ensures that files do not escape the upload procedure and prevents "selective" data upload. All files generated from the point of the last successful data upload will be transmitted upon the next update event. It is impossible for the driver to "select" periods with good driving behavior for upload and "hide" instances of reckless driving.

It is possible that the stationary processing unit registers no data set transmissions over a certain number of upload sessions. This could happen if, for example, the vehicle has not been used for an extended period of time or, for multiple driver settings, has not been used by the primary driver. It could, however, also mean that the vehicle has been used without an operating analyzing app. In this case, the fixed device would carry a certain number of no app data sets, generated while driving without app connection, that were never uploaded to the stationary processing unit because they have never been transferred to the mobile device.

To distinguish between those two cases, the app of the primary driver can contain an override routine that allows the user to initialize a data transfer from the fixed device to the mobile device without actually operating the car. The primary driver will be prompted by email, mail, or SMS to use this method to update his vehicle information. All he has to do is enter the car, activate the update function and the data is transmitted from the fixed device to his mobile device. For this special kind of data transfer, however, the file is not deleted, but remains in the fixed device memory in case the procedure has to be repeated.

The stationary processing unit may serve as central processing unit of the system. Its task is to receive encrypted data from the mobile device for one or a plurality of the following procedures:

Data decryption

Decoding of encoded time stamps

Data authentication: For each session the password and the IDs of the mobile device and the fixed device attached to each data set are verified by checking a registration data base of the stationary processing unit or remote from the stationary processing unit.

Data processing: Data related to route, speed and/or acceleration as well as the GPS reference data are processed. It is at this point that the data uploaded from the vehicle system is consolidated with map data such as found in Geographical Information System (GIS).

There are two main reasons why map processing is not performed in the vehicle system:

Stationary processing unit sided map processing ensures that only the most current map data is used.

Use of client sided map data in the vehicle system would result in considerable license fees for map services. With stationary processing unit sided processing there is only one license for the stationary processing unit.

When determining an operation characteristics parameter of a driver and evaluating it for actuarial purposes care should be taken not to interfere with the driver's privacy. For this reason one or any plurality of the following method steps are proposed which help keeping driver's privacy:

Location data as position coordinates of the vehicle are determined by the vehicle system at random instants of time. No speed can be calculated from the location data at a later date.

The position coordinates of the vehicle are stored as entries in a file and the sequence of entries of the file is randomized. The randomization can be done by randomly storing the location data in the data set and/or reorganizing the data randomly in the data set. The order can be a continuously randomized order with no indication of the temporal sequence of the entries/data.

If the vehicle system determines the travelling speed of the vehicle at a plurality of geographic locations, it then separates such speed data from the location data where this speed was driven. The speed data are separated from the location data in different files containing either the location data or the respective speed data. This should be done in a way that the direct correlation between speed data and corresponding location data is destroyed due to the separation. The randomizing of file entries enhances the separation.

When during the movement of the vehicle the vehicle system determines the speed of the vehicle, especially at random instants of time, it generates speed data and stores them in a file. A plurality of speed data can then be integrated to a superior speed value, like speed average. To prevent recourse to the individual speed values they are erased from the file after integration. The superior speed value can be generated over a travel segment and/or an area of interest, like an actuarial area. Preferably speed data are stored as running average.

The location data, as the position of the vehicle are camouflaged by a position error, especially a random position error. If the location data are used for further processing to derive further data, the location data camouflaged by the position error are used.

A travel segment like a travel route trend line is calculated from the position coordinates, especially from the camouflaged position coordinates. Each travel segment covers a plurality of alternative routes which could have been driven by the vehicle and leaving open which route the vehicle took. The travel segments can be trend lines which represent a travel trend. The trend lines can be straight direction trend lines separated by a predefined travel parameter of the vehicle, like direction change of the travelling route. Travel segments instead of exact location data do not mirror the actual route taken by a vehicle but represent directional tendencies, preferably not highly resolved enough to reconstruct a route but sufficient to relate them to areas of special interest, like geographic area, specifically actuarial areas. Trend lines may be 1.sup.st order polynomial fits to positional coordinates, preferably to positional coordinates camouflaged by coordinate errors.

The travel segments are generated by the vehicle system and uploaded to the stationary processing unit. This prevents the necessity to upload location data to the stationary processing unit which allows exact route reconstruction. The travel route is not exactly reconstructed as such but can be assigned to one or more areas each comprising a plurality of roads, such that the area assignment is free of road assignment. The areas can be actuarial areas, like areas marked by specific actuarial criteria, such as general driving behavior, traffic density, street configuration etc. The areas can be timely fixed or be temporal areas changing with the time of the day, for example. A distance traveled by the vehicle can be divided into a plurality of different driving and/or temporal areas and the driver operation characteristics parameter, especially an average travelling speed, is determined separately for every area.

The processing of collected parameter data is distributed between two systems independent from one another, like the vehicle based system, especially the mobile device, and the stationary processing unit. This ensures that any privacy sensitive data can be camouflaged by the vehicle system before it is uploaded to the stationary processing unit.

In a further embodiment of the invention a plurality of parameter data, like speed values, are processed to an integrated parameter value, e.g. a speed average, by the vehicle analyzing system. This integrated parameter value or a value derived from it may be sent to the stationary processing unit, preferably by the mobile device. The stationary processing unit may derive a metric from this value coming from the vehicle system. A metric is a value or data that is directly comparable with a value or data analogously derived from other drivers. A metric can be a speed metric, an acceleration metric or other metric. The stationary unit can compare the metric with metrics analogously derived for other drivers.

In a further embodiment of the invention the parameter is converted into a metric, preferably via an integrated parameter value, and the stationary processing unit derives a driving risk or any related values or factors from that metric. The metric can be a speed metric, an acceleration metric or other metrics. For generating a speed metric the parameter can be a plurality of speed data of the travelling speed of the vehicle.

In a further embodiment of the invention the parameter is a plurality of speed data of the travelling speed of the vehicle, wherein the vehicle system determines an average speed value of the vehicle over a driving distance and sends this value to the stationary processing unit. The stationary processing unit compares the speed value to an average speed limit of more than one different speed limit over that distance, the distance preferably corresponding to the locations at which speed values were taken.

The driving distance can be a full journey of the vehicle, only over an area or only a travel segment. Preferably, the speed data are averaged, like integrated, into an average value over a travel segment, this procedure is repeated for a plurality of travel segments and the speed average is calculated over those travel segments resulting in an average area speed. A determined average speed of the vehicle over a geographic area or a driving distance can be compared with a speed reference, especially a speed limit over that distance or area respectively. The speed limit over that distance or area can be an average speed limit of more than one different speed limits existing over that distance or area. Such difference between determined average speed and derived average statuary speed limit can be taken as speed metric for determining the driver operation characteristics. Generally, instead of an arithmetic average over a number of single values a weighted average can be determined, giving every single value a specific weight in the average. The weight can be the length of a speed limit area, a degree of traffic danger of an area, a degree of traffic density of an area, etc.

Further to speed, acceleration is a valuable parameter for insurance purposes. To reliably determine acceleration of the vehicle, acceleration of the vehicle may be determined as driving operation parameter, especially by two separate devices in the vehicle independently from one another.

To enhance driver performance, preferably performance feedback is given to the driver. To enhance the handling of such feedback, it is proposed that a rate of determining the parameter, like speed, acceleration, average speed, average acceleration, speed metrics and/or acceleration metrics, is varied upon an input of a primary vehicle operator, like an input into the fixed device or the mobile device.

In the foregoing description of details of the invention the analyzing vehicle system contained the mobile device and the fixed device. However, it is within the scope of the invention that the device described in the foregoing as fixed device is a mobile device as well, being associated with a specific vehicle but not unremovable fixed therein. Further, it is within the scope of the invention that the fixed device and the mobile device may be combined into a single device that performs the method steps of the analyzing vehicle system alone. This single device can be a fixed device, the fixation to the vehicle being as described for the fixed device in the foregoing. Or the single device can be a mobile device being location independent from the vehicle, as described for the mobile device in the foregoing. In both cases the single device may perform the steps which were described with the mobile device and the fixed device in a single unit, and the wording "mobile device" and "fixed device" may be replaced by "analyzing vehicle system".

Further, the invention is directed to a vehicle system for determining driver operation characteristics. Preferably such system is prepared to perform one or more method steps as described above and/or in the following. The system comprises a vehicle system in a vehicle containing a base device fixed to the vehicle and a mobile device being location independent from the vehicle and a stationary processing unit.

In a further embodiment of the invention the fixed device comprises a safety element obviating an operation of the device upon disassembling the device from the vehicle.

A more complete appreciation of the invention and many of the attendant advantages thereof will be readily obtained as the same becomes better understood by reference to the following detailed description when considered in connection with the accompanying drawings.

DETAILED DESCRIPTION OF THE INVENTION

Figure 1:
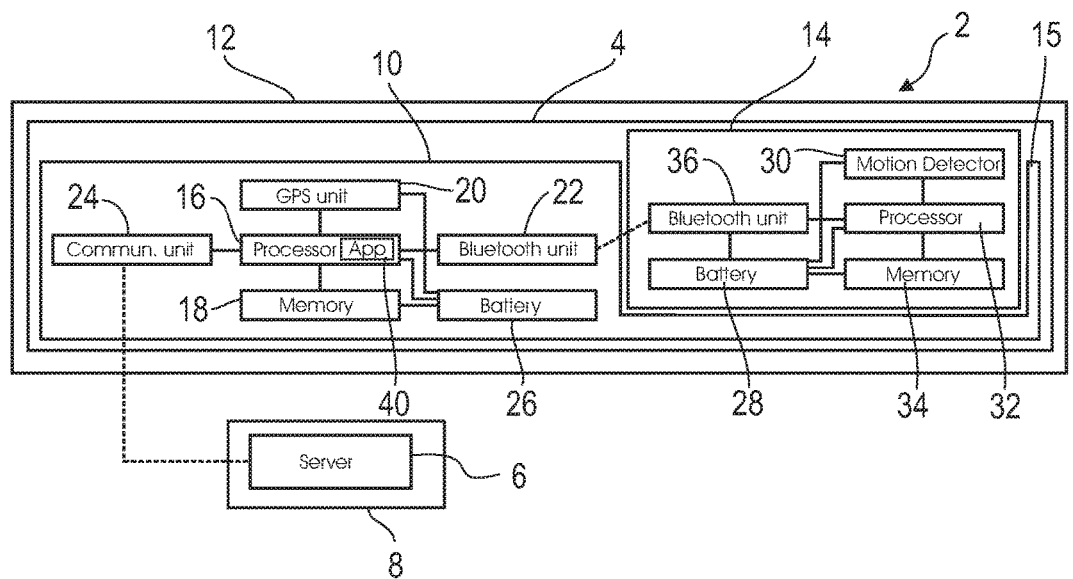
FIG. 1 shows a schematic drawing of an analyzing system with a device fixed in a vehicle, a mobile device and a stationary processing unit.

FIG. 1 shows a schematic drawing of an analyzing system 2 comprising a vehicle analyzing system 4 and a remote and stationary processing unit 6 in a building 8. The vehicle analyzing system 4 contains a base device 14 fixed to a vehicle 12 and a mobile device 10, which is a portable computer, in this embodiment a smart phone. The mobile device 10 is held in a holder 15 of the fixed device 14 and kept in physical contact with the fixed device 14.

It is to be noted, that if the vehicle analyzing system 4 does not have the fixed device 14 and works alone with the mobile device 10 the holder 15 can be constructed as stand-alone device for holding the mobile device 10. A mobile device held in the holder 15—either as part of the fixed device 14 or as stand-alone device—performs the same acceleration as the vehicle 12 and may be used as accelerometer.

The mobile device 10 contains at least a processor 16, a memory 18, a location unit 20, like a GPS unit, a communication means 22 to communicate with the fixed device, like a Bluetooth unit, a remote communication means 24 to communicate with the stationary processing unit 6, and an energy source, like a battery 26. The mobile device 10 is a smart phone. Although it is possible to run the system with other similar devices, a smart phone has the advantage that, in many cases, a driver will already own one and carry it with him while driving. Smart phones carry a processor and a substantial memory, enabling them to run complex and sophisticated software, they have a GPS component, and they offer a wide spectrum of communication options, such as telephone, like GSM, and internet connection and Bluetooth for short distance interaction with external system components.

The fixed device 14 can be seen as a cradle for the mobile device 10. Since the stationary processing unit 6 actually serves as cradle as well, the fixed device 14 is like a virtual cradle in the vehicle system 4. The fixed device 14 contains an energy source, like a battery 28, an accelerometer or other motion detector 30, a processor 32 with attached memory 34, and a communication means 36 to communicate with the mobile device 10, like a Bluetooth unit. The fixed device 14 could also be configured to hold the mobile device 10 so both devices would be in immediate vicinity if not in surface contact with one another.

Removing the fixed device 14 from its supporting surface after installation will permanently disrupt the internal mechanics of the device 14 to prevent unauthorized tampering. This is done by leading the processor energy supply line through an element which will break upon removal from the supporting surface. This element is glued on the supporting surface, has at least one predetermined breaking points, and tears upon removal.

Figure 2:
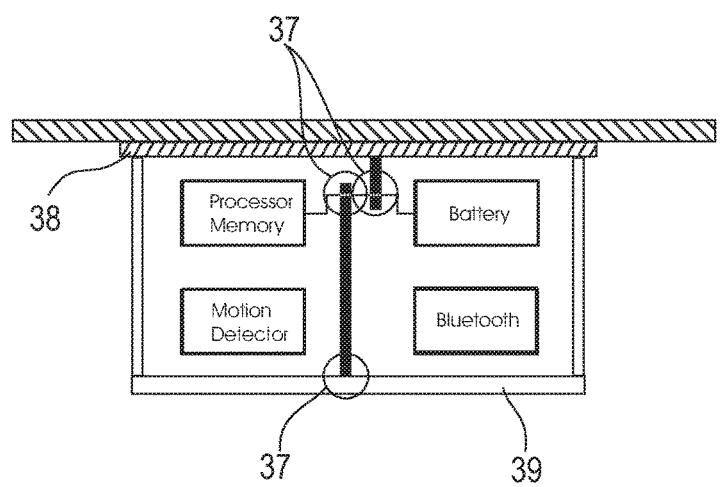
FIG. 2 shows a fixed device.

An example of such mechanism is shown in FIG. 2. The fixed device 14 is a device that is affixed to the insured vehicle 12. It preferably interacts with the mobile device 10 in a way that detects when the vehicle 12 is used without system monitoring. The fixed device 14 is a relatively simple device that comprises a replaceable battery 28, accelerometer, or other motion detection means 30, and processor 32, memory 30 and Bluetooth 36 or other data transfer means. It is meant to be affixed to a vehicle surface and requires no professional installation.

Key in the physical design of the fixed device 14 is that any unauthorized removal will cause a disablement. An example for such a configuration is shown in the schematic way in FIG. 2. However, other configurations are possible as long as they effectively counteract unauthorized removal of the device. Hence, once the fixed device 14 is installed in a given vehicle, it cannot be moved to a lower risk vehicle to "con" the system. In the example of FIG. 2 the wire connection from battery 28 to processor 32 runs through plugs 37. At least one of the plugs 37 is connected to a plate 38 which is glued to the windshield of the car. When the device 14 is separated from the plate 38 or the cover 39 opened, the respective plug 37 is pulled and the wire is cut.

A driver, like an insurance customer, who wishes to operate his car in connection with the analyzing system, passes required registration information to a system operator, such as his insurance company. The registration information may contain an insurance policy number, information on vehicles he wants to register and a password which will allow him to access his profile and the feedback features. He can also identify other persons who will use the same car. In this case he will be registered as the primary driver, whereas the other drivers will be registered as secondary drivers.

During operation of the system the driver operation characteristics parameter of the primary driver will be observed and stored in a primary driver profile. The primary driver gets the possibility to access in the stationary processing unit his profile and the feedback features which allow him to request feedback about his driver operation characteristics. The driver operation characteristics of the secondary drivers will be observed as well and stored in secondary drivers profiles respectively. The secondary drivers may or may not get access to their profile or any feedback features. Individual feedback and access are determined based on the insurer management of the system 2 and the desire to create remedial feedback to respective drivers in addition to the primary driver.

Each driver can then download a personalized and registered copy of an analyzing app 40 to his mobile device. This app 40 is a software application that is made for generating and processing parameter data. The app 40 is stored or installed in said driver's mobile device 10 as specified and identified during that driver's registration. Each copy of the app 40 comes with a unique identification code (mobile ID) that refers to the customer files/profile on the stationary processing unit 6. Each mobile ID is encoded to distinguish between a mobile ID of the primary driver or of a secondary driver. Any driver sharing the vehicle with the primary driver has its own copy of the app 40 which he can download from the stationary processing unit which will also carry a unique mobile ID.

Preferably, for data transmission to the stationary processing unit 6 only the mobile device 10 or the primary app 40 of the primary driver will be used. That means that only the mobile device 10 of the primary driver is used as the interface for data transmission to the stationary processing unit 6. If the fixed device is operated with an app 40 of a secondary driver, the data sets will be stored in the fixed device 14 and send to the stationary processing unit 6 only if the fixed device 14 is operated later with the app 40 of the primary driver.

Each vehicle 12 registered in the stationary processing unit 6 as participating vehicle 12 is equipped with a fixed device 14 that also carries a unique ID, called base ID in this context. The base ID can be stored in the fixed device 14, preferably before mounting in the vehicle 12. This can either be achieved by allocating a base ID to a customer profile upon registration and then load it into the fixed device prior to installation, in which case the registration precedes the device installation, or by first installing the fixed device 14 in the vehicle 12, capturing the device base ID, for example by scanning a barcode or key said ID into the registration process, and then transmit this code to the stationary processing unit 6, where it will be allocated to the customer profile. In the last case, installation of the fixed device 14 precedes registration. It would also be possible that a base ID is generated upon registration, then sent to the mobile device 10, and from there it is transmitted to an already installed fixed device, e.g. by an activation key or similar method.

To each base ID one mobile ID of the primary driver is assigned. If secondary drivers are registered to that vehicle 12, the corresponding secondary mobile ID of each secondary driver is assigned to the fixed ID.

Any time the vehicle 12 is operated the fixed device 14 starts a communication session with the mobile device 10. If the mobile device 10 or its app 40 respectively is present and active the base ID and the mobile ID will be checked whether both IDs are assigned to one another. If no app 40 is found by the fixed device 14 it will record that the vehicle 12 is operated without app 40 monitoring.

The assignment check of the base ID to the mobile ID can be done in more than one version:

The fixed device, after being activated by vehicle movement, will not only poll for the app 40 from the mobile device 10 but also will make sure that the mobile ID stored in the app 40 matches its own base ID. The base ID allows the fixed device 14 to recognize authorized apps 40, and authorized mobile devices 10 or drivers, respectively. This is necessary in case that the passengers in the vehicle 12 are also customers to the same insurance company and carry in their own smart phones app 40 that are valid but not authorized for this car.

In another approach the base ID is sent from the stationary processing unit to the app 40. Alternatively the base ID may already be part of the app upon download from the stationary processing unit 6. During the communication session between the devices 10, 14 the app 40 checks if the base ID sent from the fixed device 14 is assigned to the mobile ID.

Alternatively, the assignment of mobile ID and base ID to one another is done during a communication between the devices 10, 14, preferably during the first communication session between the devices 10, 14. During the session the ID is communicated, either the base ID to the app 40 and/or the mobile ID to the fixed device 14, and the two IDs are assigned to one another in the fixed device 14 and/or the mobile device 10. For this approach, each driver, when using the vehicle 12 for the first time after registration, has to make sure that, at least for a short distance, no other mobile devices carrying a respective app 40 are in the vehicle 12.

When the two IDs are checked and are correct, meaning that the two IDs are assigned to one another, the two IDs will be part of data sets, preferably each data set, that is sent from the app 40 to the stationary processing unit 6. In this way, each data transmission to the stationary processing unit 6 is characterized by a combination of two IDs, a mobile or driver ID and the base or vehicle ID. The authorized combinations of IDs are recorded in a participant file of the stationary processing unit 6 and, in case of multiple drivers, allow the driving characteristics to be related to a specific driver. Final validation that the mobile app and driver are authorized is done after upload to the stationary processing unit 6.

If the vehicle system 4 goes without the fixed device 14 the check of IDs within the vehicle system 4 may be omitted, and the mobile device 10 sends its mobile ID to the remote unit 6 for allocation to the driver's insurance files.

Figure 3:
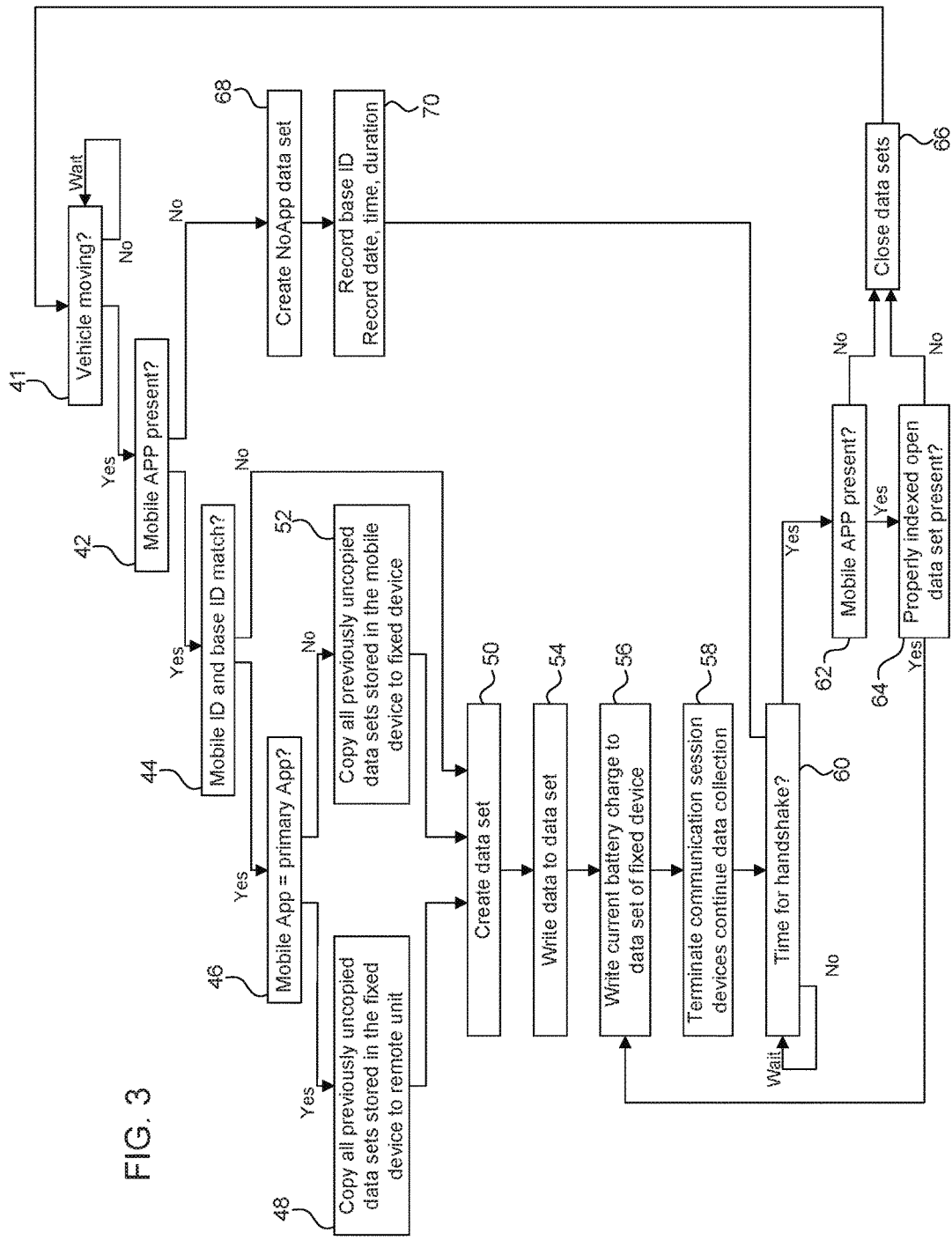
FIG. 3 shows a flow diagram of an interaction between the fixed device and the mobile device.

FIG. 3 shows a flow diagram of a preferred interaction between the fixed device 14 and the mobile device 10. For the following description of a preferred embodiment it is assumed that the vehicle 12 is a car and is equipped with a fixed device 14 registered in the stationary processing unit 6, and that the driver carries a mobile device, like a smart phone, with a registered analyzing app.

The motion detector 30 of the fixed device 14 senses that the car starts to move. For this the motion detector 30 operates in a standby mode keeping an acceleration sensor at work either permanently or in regular time intervals. When in step 41 the motion detector 30 senses a movement of a car which is above a predefined motion or acceleration threshold, it triggers a change from the standby mode to an active mode of the fixed device 14.

The detection of a vehicle movement prompts the fixed device 14 to search in step 42 for an active analyzing app 40 within the vicinity of its communication range, like with Bluetooth. If such app 40 is found the fixed device 14 matches in step 44 the mobile ID stored with the app 40, and validates it by matching its own ID with it. Alternatively the app 40 matches the base ID sent by the fixed device 14 to the app 40 with the authorized base ID stored in the app 40 and checks in this way the assignment of the base ID with the mobile ID. Further the app 40 or the fixed device 14 checks in step 46 whether the mobile ID is the primary ID or a secondary ID, i.e. the ID of a secondary driver.

The fixed device 14 may only have the primary driver mobile ID stored. If a secondary driver is driving, then that driver's app 40 recognizes that it is in contact with a fixed device 14 to which the app 40 is authorized. The app 40 sends its mobile ID to the fixed device 14 and they begin a parameter data collecting session. The fixed device 14 notices, that the driver is a secondary driver and does not upload that session data set to the mobile device 10, but waits until it is connected to the primary mobile device 10 for the next time.

It is to be noted that the system 4, at this stage, does not validate whether the app 40 and/or the fixed device 14 have been registered for this specific vehicle 12 or fixed device in the stationary processing unit 6. It may happen that changes in the insurance occurred, like deletion or addition of a secondary driver from/into the primary driver's profile, of other amendments. This verification is done later at the stationary processing unit 6 by matching the two IDs with the registration information, preferably the most current registration information.

If the mobile device 10 is the device of the primary driver, the fixed device 14 copies in step 48 all previous uncopied data sets stored in the fixed device 14 to the mobile device 10. When finally the sessions data sets are uploaded to the stationary processing unit 6 that unit 6 checks if by means of the base ID and the mobile ID of each data set it the respective data collecting session was a truly authorized session.

Next, the fixed device 14 accesses in step 50 the memories 18, 34 of the mobile device 10 and of the fixed device 14 and generates in each of them a data set in a form of a data capsule, like a file, in which parameter data are written later. A data capsule is a corresponding receptacle for the data collected during an analyzing session. Although the data capsule contains a data set the terms data capsule and data set are seen as equivalent with regard to this invention.

If in step 44 no mobile ID is found with the app 40, the process continues in step 50. If in step 46 the app 40 is not the app 40 of the primary driver, then all previously uncopied data sets/capsules from this mobile device 10 are copied in step 52 to the memory 34 of the fixed device 14.

Each data capsule/set comprises a data capsule index number, the index number of corresponding data capsules are identical. Upon initialization the system 4 stores on each data capsule a data set. The following data are stored in the data capsule of the fixed device 14:
  Index number n of the data capsule (step 54)
  base ID (step 54)
  mobile ID (step 54)
  current level of battery charge of the mobile device 10 (step 56)
  Time/date marker of the event (step 54). Such a marker may not be in plain times and dates but in encoded numbers to prevent unauthorized manipulation.

The following data are stored in the data capsule of the mobile device 10:
  Index number n of the data capsule, which is the same number as in the fixed device 14 (step 54)
  base ID (step 54)
  mobile ID (step 54)
  Time/date marker of the event (step 54). Such a marker may not be in plain times and dates but in encoded numbers to prevent unauthorized manipulation.

After this the communication connection between the devices 10, 14 is terminated in step 58 to save energy. After this termination or already during this termination both devices 10, 14 collect parameter data. This is done independently by both devices 10, 14. The parameter data are written in the data set/capsule and are stored in the respective memory 18, 34.

At predetermined intervals, like every hour, the system 2 attempts to re establish the communication connection between the devices 10, 14. Accordingly, the timer is consulted in step 60 to see whether the time interval is completed. If not, this request is continued in a loop until the time interval is completed. Then the communication connection is reopened triggered by the fixed device 14. The presence of the active app 40 is checked by the fixed device 14 in step 62. If the app 40 is active the properly indexed and open data capsule is verified in step 64. If yes again a loop is passed between steps 56 and 64. If no active app 40 is found in step 62 or the active app 40 does not contain the properly indexed and open data capsule, then the system proceeds to step 66, where the data capsule in the fixed device 14 is closed. Then the procedure goes back to step 41.

When the fixed device 14 does not sense vehicle motion for an extended period of time, it goes back to standby mode and waits until the motion sensor 30 detects motion. The vehicle 12 may be parked, and the system 4 will wait in the standby mode for the next motion of the vehicle 12. The standby mode is the mode of the fixed device 14. The mobile device may operate a little while longer than the fixed device, since the mobile device does not react on the absence of motion of the vehicle but the on the absence of a handshake from the fixed device 14. Since the fixed device 14 is in standby the handshake will not be initiated by the fixed device. After the predefined timespan between handshakes the mobile device notices the absence of the handshake and closes its data collecting session. The app 40 may be shut off, deactivated or ended. The current data capsule will stay in the mobile device 10 as well as in the fixed device 14.

This current data capsules n—when they are closed in the fixed device 14 and remain in the mobile device 10—are still incomplete until the same driver and his app 40 sign on again. Upon a new communication session between the fixed device 14 and the same mobile device 10 of the same driver—checked with the IDs—the contents of data capsule n of the fixed device 14, as the two IDs, the battery load of mobile device 10, time information about sessions, preferably acceleration data, etc, will be added to the data capsule n of the mobile device 10 which will then upload its data capsule n to the server 6 of the insurance company. Alternatively, the data capsule n of the fixed device 14 is sent to the mobile device 10 which then will upload both, its data capsule n and the data capsule n of the fixed device 14 to the stationary processing unit 6.

Then a new data capsule n+1 is started in both devices 10, 14 and a new data collection session starts. It is to be noted that the new data capsule may have a higher number, as n+2, n+3, or even higher, depending on the secondary drivers having driven the vehicle 12 in between.

Again, if the vehicle 12 is moving again an "open" data capsule n with the correct index number n can be found (step 42), the procedure continues further as before, checks the mobile ID and records the mobile battery charge in the reopened data capsule n of the fixed device 14. If, on the other hand, still no active app 40 is present (step 42) the fixed device 14 creates a new and special data capsule n+1 for parameter data collection without app 40 in step 68, that contains the following data:

Information that the vehicle 12 is operated without proper monitoring
Index number n+1 of the no app 40 data capsule
Identification code of the fixed device 14
Time/date marker and duration of the event.

If the fixed device 14 detects motion and an active app 40 of the mobile device 10 but no properly indexed data capsule (as would be the case when the car has been switched between drivers), the system 4 opens a new session by generating a newly indexed data capsule in the fixed device 14 and the mobile device 10. Such situation can happen if the foregoing session was a session with the primary driver and the successive session is a session with a secondary driver. The old and "unfinished" data capsule n between fixed device 14 and primary app 40 remains in the fixed device 14 and the primary mobile device 10 until they start a new communication session at later time.

In another embodiment of the invention and to further avoid tampering with data before upload the data capsules can be stored non sequentially and the IDs need not be sequential and even the data capsules created simultaneously in the fixed and mobile device 14, 10 can be given different encoded ID numbers that only upon upload can be re-united as the same data capsule.

Hence, if someone has really pushed the limits in driving wildly he cannot go into the datasets in the mobile device prior to upload to the stationary unit 6 and edit that wild session out since it will not be in sequential order. Time and date will be encoded and the driver will not know what is the mobile device's data capsule part corresponding to a given fixed device's part of the data capsule.

Together with step 58 a process loop is passed with the retrieval, whether the vehicle 12 is still moving. If the motion detector 30 signals a rest of the vehicle 12 over a predetermined time span the fixed device 14 jumps to step 66 and closes its data set. It may turn to standby mode and waits until a respective signal from the motion detector 30. This inactivity time span should be long enough that it is not affected by the stop-and-go-traffic found in traffic jams.

Since the mobile device 10 is also programmed to expect the handshake connection of step 60 at certain intervals, a missing handshake will cause the app 40 to stop data recording and close down its data capsule. The app 40 may close and wait for a new activity trigger by the fixed device 14.

When, after closing all data capsules n, the vehicle 12 starts again, the fixed device 14 attempts to establish a connection between the devices 10, 14. The fixed device 14 polls all analyzing apps within its Bluetooth reach for validation. If more than one app 40 can be found which are all valid for the base ID the system selects the mobile device 10 with the strongest signal, facilitated by placing the mobile device 10 as close as convenient to the fixed device 14 and preferably in the holder 15. Then it proceeds with step 44 as described before and generates in step 50 for the present combination of devices 10, 14 a new set of data capsules indexed n+1.

When multiple apps 40 are present, indicating that multiple mobile devices 10 from different drivers are present, the fixed device 14 can poll present data capsules from all such responding mobile devices 10 which indicate that they are authorized for this fixed device 14 or its base ID, respectively. Hence the fixed device 14 can acquire relevant data capsules even from authorized and not driver engaged mobile device/app 40.

If the mobile ID indicates the app 40 selected by fixed device 14 is the primary driver (step 46) the fixed device 14 transfers all previous data capsules to the memory 18 of the mobile device 10, regardless whether they were compiled for this device 10 or not. All these files are transferred later from the mobile device 10 to the stationary processing unit 6. The fixed device 14 keeps a copy of the transferred files for backup. The system 4 then continues to operate as described for the initial session.

In case the vehicle system 4 performs the collection of driver operation characteristics parameter alone and no fixed device 14 is present, the method as described with the data sets or data capsules may remain unchanged except that the data of the data set of the fixed device may be omitted or generated by the mobile device, like battery power or acceleration values.

A slight variation of this process is described in the following. Since the processes described are similar, one or more details of each description may be inserted in the other description either additionally or in replacement for the respective detail of the other description.

The unique aspects of the fixed device 14 revolve around how it is able to monitor, quantify and report attempts to use the insured vehicle 12 without system monitoring. The fixed device 14 linkage to mobile device 10 starts when the fixed device 14 detects via its motion detector/accelerometer 30 vehicle movement. This starts a process where the fixed device 14 attempts via Bluetooth 36 or any other appropriate means of data transmission to contact the mobile device 10 in the vehicle 12 and determine whether it contains a functioning insurer app 40 (step 42) and also determines if it is registered (step 44) and has the proper user password, which can be done within step 42. The level of password protection can include the fixed device 14 prompting the mobile device 10 to request direct entry by the driver on its key pad or it can be pre-stored in the application when it is initially download by the insurer, or by the system operator, to the participant. The fixed device 14 allows for adding insured parties, changing designated smart phone and changing password. The mobile device 10 is a smart phone in this embodiment.

The fixed device 14 records the related registration and password information in the app 40. This information is only verified upon upload to the stationary processing unit 6 and in that stationary processing unit using records of all approved drivers, passwords etc associated with a given insured party or vehicle. The session proceeds only based on the presence of said datum in the app 40 but without validation. As will be discussed later in this section the Virtual Cradled downloads to the smart phone app 40 data capsules. This step can be restricted to only those registered app 40 and passwords that have previously interacted with the said fixed device 14 multiple times.

The fixed device 14 records the smart phone battery level (could be done within step 42) and defines for the transit session now underway a data capsule with a sequence number (step 50). A data capsule is basically a file or a set of compiled data, such as, for example, the speed and/or acceleration, which can be used as speed and/or acceleration metric raw data. At this point the initial Bluetooth session ends (step 58) but the fixed device 14 data capsule does remain active recording those acceleration or deceleration events that exceeded a predefined threshold, such as g-force or change in speed per second, and storing them with their respective time stamps. These time stamps to further preserve privacy can be quantized time in units of for example 5 minute time windows.

While in transit the fixed device 14 records in data capsule n the duration and smart phone battery level it has detected. In parallel the smart phone app 40 records and processes parameter data as will be described later, as fuzzy GPS, trend line coordinates, speed and acceleration metric raw data, etc.

At given time intervals, like every quarter hour for example, if the fixed device 14 senses continued vehicle motion, it attempts to contact to the smart phone app 40 by Bluetooth or other communication means to confirm it is still in operation and once again monitors smart phone battery level. If the smart phone app 40 does not receive a fixed device 14 handshake at the appointed period of time it stops its data collection and closes the data capsule (step 66). If the fixed device 14 does not sense movement for a given period of time it also logs the end of transit and closes that data capsule. Hence at some point both the fixed device 14 and the app 40 have closed their respective data capsules n and stored them.

The smart phone data capsule n may contain more data than the duration of transit logged by the fixed device 14 data capsule n such as might occur if the driver left the vehicle and got on a train with the app 40 still active. The app 40 will then only stop recording data when it fails to get its hourly handshake from the virtual cradle 14.

When the fixed device 14 detects vehicle motion but does not detect an app 40 the fixed device 14 creates a special data capsule n*, like n+1, and records therein the time and duration of the event where the vehicle is in transit with no app 40 active.

The next time the fixed device 14 detects vehicle motion and connects with the smart phone and validates the appropriate app 40 is active, it defines a new joint data capsule n+2 and downloads to the smart phone the previous data capsule n containing the duration of transit n and also the data capsule n* that reports the transit and duration of transit n* without app 40 active.

When the stationary processing unit 6 now requests an upload, it receives all the data capsules with their respective parameter data and all the fixed device 14 data capsules with their recordings of transit time and related smart phone battery level. Some of the conditions then examined and detected are:

When a fixed device 14 data capsule n is opened and its corresponding app 40 data capsule is opened; the transit time of the fixed device 14 is taken as the transit duration of interest and any additional recordings in the app 40 data capsule n are discarded.

If the fixed device 14 data capsule n has recorded a low smart phone battery and the app 40 data capsule terminated data collection early—the coincidence of events is reported to the insurer as a possible explanation. The converse of a sufficiently strong battery and premature termination is also reported in case an attempt is made to circumvent monitoring by reporting a (false) dead battery.

If there are gaps in the sequence numbers the stationary processing unit realizes the potential for data tampering.

If Acceleration/Deceleration events are logged, preferably in both the fixed device 14 and the mobile device 10/app 40, then the data capsule n lists the (joint) occurrence of acceleration/deceleration events exceeding an acceleration threshold and their respective quantized time stamps. The events may be adjusted to smooth any anomalies. The resulting list is sent to the remote unit 6, preferably as input to an acceleration metric. In the preferred embodiment these acceleration/deceleration events are recorded with adequate resolution and definition by and accelerometer or similar detection circuitry in the fixed device 14.

The fixed device 14 has a battery replacement warning light, and for example, based on the number of data capsules transits that the stationary processing unit 6 monitors, an email can also be sent to the enrolled party advising them to change the fixed device 14 battery.

In the foregoing description of the preferred embodiments the vehicle system comprises the fixed device, called virtual cradle, and the mobile device, like a smart phone with the respective app. However, the invention is not limited to this constellation. The vehicle system 4 may contain a single device which performs some or all of the above described functions of the method as described above, or more than two devices interacting to perform the functions. Preferably, the single device is fixed to the vehicle 12, especially as described with respect to the fixed device 14. A device performing the method steps of the mobile device 10 is then integrated in the single device.

Advantages of the analyzing system are being a non-invasive methodology for allowing an insurer to initiate a pay how you drive program that couples:

Reduced driver insurance rates/risk, and influence remedial safer driving.

Detection of high risk driving patterns while maintaining insured driver privacy on par with mobile telephony.

The system has totally different business models and ramifications based on whether the application is viewed as discretionary versus non-discretionary. Essentially it is a defining aspect of the invention that operation may not be at the discretion of the vehicle driver but may rather be defined and specified by the insurer. If it is wanted that the driver is able to turn of the monitoring at will, the app 40 may have a feature that deactivates monitoring or deactivates the app 40 as such completely. If only the monitoring function of the app 40 is deactivated, the ID match can still be performed, giving the information to the stationary processing unit 6 that an authorized driver drove the vehicle 12. Then the insurance payback can be adjusted by the duration of non-monitored driving. If the app 40 is deactivated completely the insurance payback can be adjusted differently for enrolled versus non-enrolled drivers, since in that case there is the possibility that a non-enrolled driver was driving the vehicle 12.

Further, the system 4 can operate privacy compliant. It can be avoided to compile information that could be legally actionable in court for fining a driver. This can be done, for example, by eliminating at least two elements of the legally actionable three elements of information:

Time of Occurrence

Location

Driving Characteristic (e.g. speed) before upload to the stationary processing unit 6.

The system requires no GIS information in its smart phone app 40 and hence has no per smart phone app 40 GIS license fee issues. Additionally the system provides feedback to insurer and insured with respect to speed, acceleration and privacy protected reconstructed approximation of route.

Further the mobile system, as a smart phone with an app, needs to coexist with other apps co-resident in smart phones and with the mobile phone's primary function which is telephony. These functions come together in memory allocation management and in particular battery drain management. The system is not in continuous smart phone positional polling or in continuous dialog with the Virtual Cradle. Although the system is a non-discretionary system, we only poll at random, discrete occasions GPS (with no concurrent GSM positioning assist). As has been detailed, this is part of a purposeful strategy to provide all the motoring information required while seamlessly assuring that locational anonymity is maintained.

The communication between the mobile system and the fixed device 14 is purposely structured as triggered only upon start of movement of the vehicle and then with handshakes, preferably performed regularly, like every quarter hour.

In the following the steps of route reconstruction are described.

The analyzing system 2 is able to reconstruct a route of a given transit driven by the vehicle 12 in a manner that, while totally protecting privacy, it generates meaningful actuarial data. Furthermore the route reconstruction allows posing the other operation characteristics, as speed quality metric and acceleration quality metric—in a manner that provides the most actuarial inference as well as most meaningful and relevant remedial feedback.

The route reconstruction by the analyzing system 2 proceeds in this embodiment by taking location data, as GPS coordinates, as the vehicle transits a journey route. Preferably the location data are taken randomly, like at random intervals of time. GPS throughout this disclosure is used in a generic sense meaning GPS in special or any means of affixing position of the vehicle 12. It does not exclude other comparable systems such as Galileo or other non-RF or terra-firma based position systems based on RF or hybrid technology such as differential correction.

The position coordinates can be taken by the mobile device 10, like a smart phone with GPS function. While the vehicle is in transit, the app 40 prompts the GPS unit in the Smart Phone to take positional readings at random intervals. Actually these could be identical to the coordinates captured for the purpose of speed recording. The mobile device 10-position function is used in snap-shot mode and registers positional coordinates as depicted in FIG. 4.

Figure 4:
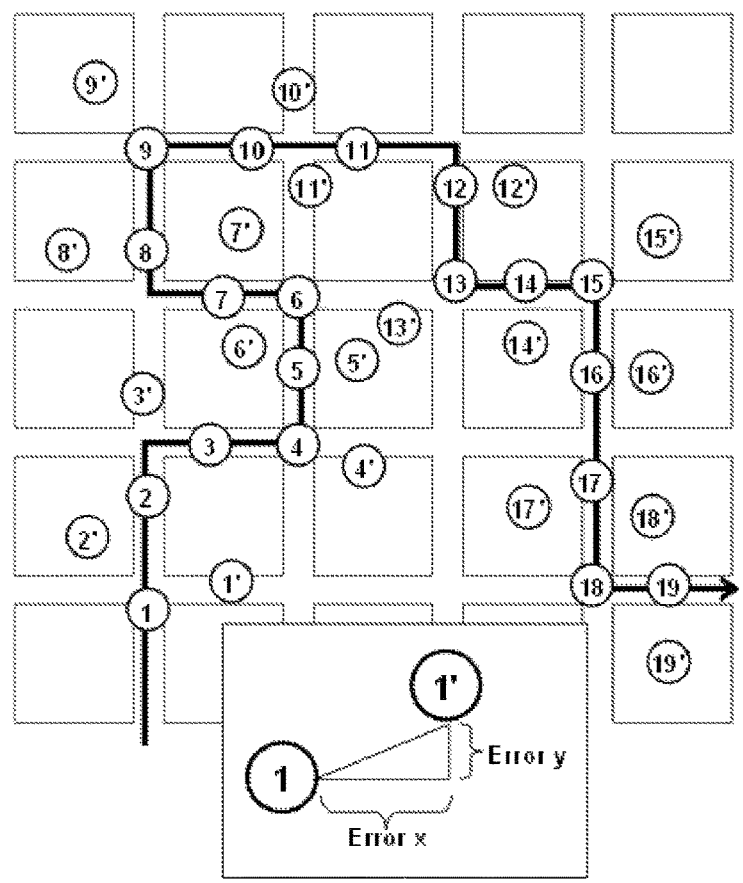
FIG. 4 shows a process of randomization of location data.

FIG. 4 shows a schematic city map with a plurality of blocks and streets. The driving route of the vehicle 12 is shown in a continuous line. The location data are positional coordinates that are taken while the vehicle 12 travels the driving route. Further, speed data are calculated, like the actual speed of the vehicle at certain moments or locations. The speed data may be derived from the location data as shown or from separate location data which is used only for speed calculation. In the embodiment shown in FIG. 4 the speed data are derived from the location data resulting in a vehicle speed at every location point. The mobile device 10 then has the following data:

location data as positional coordinates,
time of location data, meaning the time when the vehicle passed the respective positional coordinates,
speed data at the positional coordinates, and
time of speed data—if different from location data.

It should be noted that such time data as noted above can be quantized time windows of, for example, 5 minute increments that further ensure that all datum collected from it, inception is not legally actionable.

To protect privacy the system camouflages these data with one or more of the following method steps:

Location data are camouflaged by adding a random error.
Location data are mixed in order, like randomized in order. While the individual point coordinates remain unchanged the order of the point coordinates are continuously randomized. This is to obscure the sequence of their storage in order to foreclose reconstruction of the route.
Speed data is stored in a separate file from the location data.
Speed data are mixed in order, like randomized in order.
A plurality of individual speed data are inducted to one average speed data. This process can be repeated for many sets each with plurality of individual speed data. This makes it impossible to bring back the individual speed data. The average speed can be a running average.
Where average speed data are generated, the individual speed values are erased from the memory 18.

All these method steps are preferably done in the mobile device 10 before a transfer to the fixed device 14, at least in the vehicle analyzing system 4, and before transmitting any of the above data to the stationary processing unit 6.

Camouflaging Positional Data

While still in the memory of the vehicle system 4, each received GPS set of positional coordinates that will be used for travel segment construction is camouflaged by adding a random error to at least one of the x or y coordinates, preferably to both, the x-coordinates and y-coordinates. This can be done, for example, by inducing random fluctuations into the Circular Error Probability (CEP) with which GPS is normally resolved: i.e., +/−10 meters 50% of the time. The random fluctuation can be introduced to length of error and/or direction of error. With fixed error length the CEP for the current route calculations location points can however be increased by adding a predefined length, like 200 m as shown with the slashed positional coordinates in FIG. 4, or with random circle diameter, preferably always larger than a predefined threshold. The random circle diameter can be adapted to the driving environment, resulting in a larger diameter in areas of low road density as in rural areas, and smaller diameter in areas of high street density, like in urban areas—thereby being attuned to maintaining route anonymity. This means on average a given GPS data point no longer has its nominal CEP of 10 meters but rather a significantly greater distortion that is purposely introduced, preferably while the data is still resident in the vehicle system 4, especially in the mobile device 10. Although this "fuzzy location" data has lost its CEP +/−10 m relevance, and hence gives the user greater anonymity than they normally get as part of mobile telephony, the location data have not lost their value for route reconstruction.

Route reconstruction can be done by generating travel segments, like trend lines, of the route driven. Preferably the travel segments do not reflect roads driven but leave a probability of many alternative roads within the travel segment.

Figure 5:
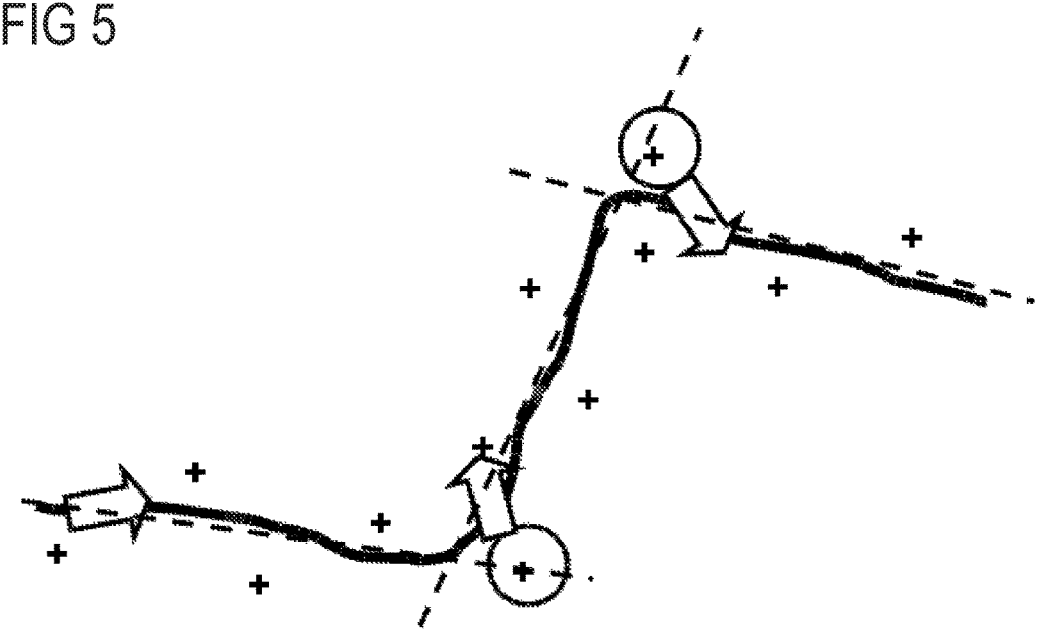
FIG. 5 shows the generation of trend lines from the randomized location data.

Such travel segments are shown in FIG. 5. While the route driven is shown in a solid line, the travel segments are shown in broken lines. The randomized location data are depicted with crosses. In this embodiment the travel segments are trend lines which can be calculated via a series of least squares error first order polynomial fit of the general form, (Y=a+bX), or higher order polynomial, for example, although other line and trend fitting methods can be used. When a plurality of randomized location points is present, the current trend line is calculated, preferably in the mobile device 10. When the route driven changes direction the current trend line is terminated and a new trend line is calculated.

The transition from one trend line to the next following trend line can be determined by a nominally monotonic decrease in b below a predefined threshold. For instance, if the least squares are increasing over two, three or more successive points this is considered as indicator to end the present trend line and start a new one. The actual movement of the vehicle is thus transformed via coordinate camouflaging and least squares fitting into a series of trend lines, each trend line being defined by a start coordinate point and a termination coordinate point. The start/termination coordinate point can be the cross point of two trend lines or one of the positional coordinates or coordinate points in other words. The respective coordinate point can be the point where the second, third or following successive decrease of b happened, this point belonging to both trend lines.

In this manner the pattern of nominally a monotonic decrease in "b" is used, as additional Fuzzy GPS points are added to the least squares calculation, as an indication that a directional change has taken place requiring the end of one trend line and the start of another. The exact steps taken in determining the beginning and end of each trend and their intersection points may differ as a function of the frequency of Fuzzy GPS sampling and potentially factors related to the magnitude of CEP error introduced.

These trend line coordinates are stored by the app 40 in a file, each trend line carrying an index number for identification plus an encoded time marker. The time marker can be the times when the vehicle passed the start point and the termination point. These data are transmitted to the stationary processing unit for further processing later. Like all data transmissions the data can be encrypted either before or during storage or before actual transmission.

In summary an embodiment of trend line computation can be described in the following steps:
  While the vehicle transits a route, positional coordinate readings are taken at random intervals.
  Each coordinate value is modified by adding/subtracting a random or predefined numerical value. The result is a Fuzzy Coordinate Point.
  These Fuzzy Coordinate Points are used as an input to a Least Squares Error First Order Polynomial (Y=a+bX) or other curve to data fitting line technique, plotting a series of such trend line segments, each trend line segment being defined by a start and a termination point. These trend line data are written in the current data set of the mobile device 10 and uploaded to the server 6 for further processing.

When the respective trend lines are eventually uploaded to the remote stationary processing unit 6 these trend lines or end points of trend lines can be overlaid on digital road maps to approximate mileage as shown in FIG. 5. The assignment of the trend lines may take place in the stationary processing unit 6 where at this point only road/street data is required. In practice, the process of mapping trend lines to possible roads/streets is like a second encoding of the actual transited route and further obscures any details of the vehicles actual route.

At this point in the stationary processing unit 6 the underpinning of route information is stored with some degree of temporal information—but not to such degree, that information is derivable about when and where the vehicle was at any point in the transit.

As explained above, the driver operation characteristics parameter may be speed and acceleration, etc. Better actuarial inference is achieved by speed metrics and/or acceleration metrics as advanced driver operation characteristics parameter. The speed metrics can be generated from the travel segments. The travel segments can be trend lines or areas of actuarial interest.

Speed Metrics, Acceleration Metrics and Other Metrics

Individual speed values do only reflect driver behavior to a low degree. Better description of driver operation characteristics may be obtained from special metrics that are derived from speed and/or other values. Further, metrics can be generated in a way that maintains privacy protection.

For that reason speed metric may be based on the clear and permanent separation of individual speed value measurements from the location where those measurements have been captured. The storage of speed values and location is performed in a way that prevents re-association of any individual speed value with a specific coordinate point.

When a travel segment is calculated, the vehicle has thus passed the transit point to the next following trend line, a speed information is assigned to the travel segment. This can be done in the following way.

The individual speed values from point within the travel segment are combined to travel segment speed information, like an average speed within the travel segment. During the generation of the travel segment the speed can be determined as running average over the travel segment. The renewing of the running average can be stopped as soon as the travel segment is finished, like at the beginning of a new trend line. At that point the vehicle system 4, especially the mobile device 10 contains the following data:
  The travel segment coordinates.
  The average of the speed values of the respective travel segment.
  These data are transmitted to the stationary processing unit 6 for further processing.

Further the randomly organized location data are transmitted to the stationary processing unit 6 for further processing. These data may be the randomly organized location data, as GPS point coordinates, used to compute the speed values, carrying no reference to the speed values themselves and no timestamp, preferably having no temporal relationship further than they were compiled during the time window associated with their timeline. The storage sequence of these data is—preferably continuously—reorganized in a random order.

At the stationary processing unit 6 the point coordinates are processed via a data base, such as a GIS map, that assigns to each coordinate point on a road a speed reference. The speed reference can be the statutory speed limit. However, the speed reference can be other speed data, e.g. the average speed of a plurality of vehicles at that point during that time of the day. This speed reference may be lower at daytime than at night and even lower in rush hour than at other times of the day. To obtain the time of the day a daytime value may be assigned to any travel segment. However, such time value may be omitted.

Other reference speed congestion and related inference information/parameters used in said metrics (inclusive of the later discussed acceleration metric) can also be taken from other sources other than a GIS map and may also be employed for this purpose, either instead or in addition to the statutory speed limit and other datum of actuarial interest and can be used to sub-set the processing of said metrics into units most germane to insurance inference. Such information from GIS and/or other sources can be processed in the same manner as described hereafter for the statutory speed limit.

For reasons of simplicity the speed reference is the statutory speed limit in the following. The stationary processing unit 6 may then extract from the data base the information on how fast the vehicle 12 was allowed to drive on the respective roads associated with these sets of GPS location coordinates. These speed limits are then combined into an average speed reference—like average statutory speed limit—for the entire journey, for an area of interest, or for a travel segment or for a plurality of travel segments within an area of interest. The resulting average speed reference is then compared to the average actual speed of the vehicle contained in the respective journey, area of interest, travel segment or plurality of travel segments respectively. The delta between the two average speed values is the called speed metric.

Essentially, a high-risk driver will tend to be frequently and consistently significantly in excess of the statutory speed limits to the degree that when averaged over many events these high risk driving patterns will be captured by a succession of high speed metric.

The speed metric is a relative measure just like many other insurance and actuarial related parameters. To obtain a comparable value, it is suggested to compile the speed metric for good driving versus bad driving record vehicles/drivers and using them as to relatively rank other drivers as shown in FIG. 6.

Figure 6:
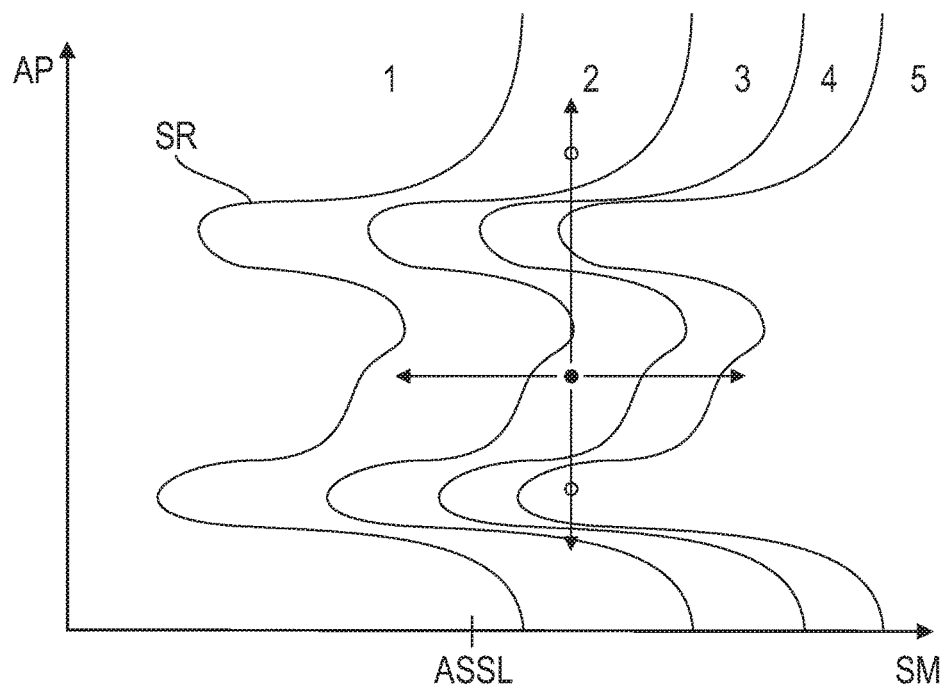
FIG. 6 shows a method of generating an individual driver score from driver operation characteristics data.

FIG. 6 shows a diagram of an actuarial parameter AP over speed metric. In this embodiment the actuarial parameter AP is the daytime starting with midnight on the bottom and ending with midnight at the top of the diagram. The diagram shows five risk zones, zone 1 indicating low risk and zone 5 the highest risk.

For purpose of demonstration it is assumed that the vehicle was driving around noon for about 10 miles within a large city, using expressway and city streets. From other insurance data the stationary processing unit 6 calculates a driving risk for the route driven by the vehicle during this journey. The four lines separating the five risk zones result from this calculation, and they will be different for other routes driven. For purpose of simplicity the four lines are identical, whereas in reality most probably they will differ from one another. Further, the risk zone may not be distinct but merge continuously from one another, resulting in continuous risk values from 0 to 100, for instance.

In this embodiment it is assumed that the average statutory speed limit ASSL for this journey was 42 mph. In this example the average speed of the driver was 45 mph, so his speed metric was 3 mph. This results in the black dot in FIG. 6 in risk zone 3. The driving risk depends not only on the speed driven, as indicated by the horizontal arrows in FIG. 6, but on the daytime of journey, as indicated by the vertical arrows in FIG. 6. If the speed metric was higher, the risk was higher, of course. However, at earlier daytime, like in morning rush hour where average speed on city streets are significantly lower, a speed metric of 3 mph would result in extreme risk zone 5, as shown with the lower hollow dot in FIG. 6. On the other hand, during night, the same speed metric is more or less acceptable and results in risk zone 2, as shown with the upper hollow dot in FIG. 6.

In summary, the speed metric is calculated to a driving risk factor, like risk zones as in FIG. 6, by using actuarial parameter, like day time, as in FIG. 6. Other actuarial parameter may be current weather, or area in which the vehicle was driven, or other actuarial parameter AP. Very important is the area in which the vehicle 12 was driven, like urban or rural, or type of road, like city streets, urban roads or expressways.

In FIG. 6 the speed metrics was calculated for the journey in total. For more exact analysis the speed metrics can be calculated for every travel segment separately. The travel segment can be a trend line or an area. It, for instance, the vehicle 12 first travels on urban roads for 5 miles, then 15 miles on expressways and after that 2 miles on urban streets, this journey can be segmented in a first urban travel segment, a second expressway travel segment and a third urban segment. In another embodiment the travel segments are trend lines as explained above. In a third embodiment the travel segments are geographic areas shaped from actuarial parameters. For every travel segment a driving risk or other parameter can be calculated which then are calculated to a total risk or parameter, like averaged, weighted, or the like.

In summary: The route driven by the vehicle 12 is tracked in two ways. By travel segments for calculating the speed driven, and by exact location data for calculating the speed reference, like average statutory speed limit.

On one hand, the exact location data are sent to the stationary processing unit 6 to calculate the speed reference. On the other hand, it is important to note that these data are camouflaged, e.g. by randomizing their sequence in the file and by separating them from time and speed data.

Further, it is important to note that travel segments can be constructed in such a way that in themselves they do not contain any information about streets, areas or any other features that would allow someone to view them directly in relation to traffic conditions. This can be done by adding a random error to location data, as explained in the foregoing. No location data arrive at the stationary processing unit 6 that describe the driving route exactly.

Travel segments are just patterns of coordinates within a geographic matrix. To put them into an actuarially meaningful context they have to be related to street map information. However, since, due to the masked coordinates the travel segments and even the trend lines do not follow the roads actually used, they cannot be mapped directly to the road network. The fact that a trend line cuts or follows a road does not necessarily mean that this road was actually part of the route. Therefore, in a further embodiment, trend lines are not matched to roads but to so-called areas or areas of interest.

Further to speed metric as driver operation characteristics accelerating metric is another useful driver operation characteristics. To determine acceleration metric of the driver or vehicle, basic procedure is similar to the one described speed metric. The acceleration/deceleration metric (for brevity in the following text the event acceleration and acceleration metric are used and infer also deceleration) differs from the speed metric in two aspects:

While the speed metric is triggered by an internal process of the system 4, like at random intervals, the acceleration metric is event driven, triggered by acceleration events initiated by the driver.

The acceleration metric is not computed by relating the actual vehicle performance value to a statutory reference limit but by computing an acceleration value, like average acceleration, per actuarial area/time.

Acceleration is hard to quantify as a risk factor in absolute terms. Rather it needs to be gauged relative to the likely prevailing speed and traffic conditions in given actuarial areas of interest. The risk factor significance of a given acceleration or deceleration is not an absolute but rather relates to where and when it takes place. The analyzing system preferably uses one accelerometer in the fixed device 14 and/or one accelerometer in the mobile device 10. Generally those acceleration events are stored which acceleration values exceed a predefined threshold.

In case the acceleration event is recorded by the mobile device 10 the app 40 associates the event with the travel segment in which the event occurred. If acceleration events are recorded and stored by the fixed device 14 only they are lacking a direct association with individual trend lines. One way to solve this problem is that each acceleration event is provided with a time marker that shows in a quantized manner a time window relatable to the compilation of a respective trend line. At the stationary processing unit 6 these time markers are matched with the time markers in the travel segments file generated in the mobile device 10, allowing the association of acceleration events to travel segments. In a second way the time marker shows when the event has occurred. The acceleration data and the time marker are sent to the mobile device 10 which associates the event with the respective travel segment and erases the time marker from its memory 18. The acceleration event is then stored in the memory 18 together with indication in which travel segment the event occurred. The file finally transferred to the stationary processing unit 6 can contain for each travel segment an average acceleration value.

If using two accelerometers they preferably operate independently from another. Both accelerometers record events that exceed simultaneously a threshold g-force on both devices. This avoids getting an undue number of false readings if the smart phone is dropped or picked up by a passenger. Alternatively, the smart phone can independently or in parallel record acceleration events that exceed a threshold, preferably as a running average. The respective acceleration values can be associated to each travel segment and stored in the active data capsule of the mobile device 10.

The stationary processing unit 6 processes the acceleration metric from the acceleration values assigned to a travel segment. The acceleration metric can be a weighted average acceleration per travel segment. As already described for the speed metric, the travel segment data is also transmitted to the stationary processing unit 6 and processed to allocate each travel segment to an actuarial area. This information is combined with the average acceleration per travel segment to compute an average acceleration per area.

Further, acceleration events may be weighted according to one or more parameters, like acceleration value, number of events per segment and/or per time, time of event, location of event, density of traffic in which the event occurred, or other. The weighted value can then be used in the calculation of the average acceleration assigned to travel segments.

Another weighting can be performed over a plurality of segments. Each segment is associated with a weighting value, dependent on one or more weighting parameters, like length of the segment, location or area of the segment, time of the day during which the segment was travelled, or other. With this the average acceleration is calculated from either many acceleration values of several segments or by relative weighting of several average acceleration values of several segments.

In summary this acceleration metric process can be performed in the following steps:

While the vehicle transits a given area its route is resolved into segments, like trend lines. The location data, like coordinates, that define each segment, are stored.

For each segment at least one acceleration value is determined, preferably an average acceleration calculated from a plurality of acceleration values. The acceleration values are stored in a way that allows to associate them with their respective segments.

The data collected in step 1 and 2 are transmitted to a central processing unit 6.

The processing unit 6 employs an appropriate data source to allocate each segment to a predefined area.

The processing unit 6 then determines an acceleration value, like the average vehicle acceleration, for each predefined area.

The acceleration metrics is—like the speed metrics—used to determine the driver operation characteristics of a driver. For evaluation purposes, the acceleration metric can be combined with actuarial parameter, analogous to the speed metric, as shown in FIG. 6, resulting in a driving risk factor or driving risk value. The actuarial parameter may be the same as used with speed metric. This may include a comparison of the acceleration metric of the vehicle driver with acceleration metrics of other drivers. If the driving risk of those other drivers is known the driving risk can be generated as a function of acceleration metrics of those drivers. This function can determine the driving risk of the vehicle driver. This "acceleration driving risk" can be related to the "speed driving risk" of the driver, the two risks being weighted and merged to a total driving risk, especially for feedback to the driver.

Further metrics may be introduced to describe the operation characteristics of the driver of the vehicle 12. One example is an "extreme metric". The driver operation characteristics parameter used to generate the extreme metric is speed data. The vehicle system 4, preferably the mobile device 10 detects and stores speeding events, when the speed of the vehicle 12 is over a predefined threshold. To detect such speeding events the speed values as obtained for the speed metric may be used. The speed threshold lies preferably over the highest speed limit of the region travelled by the vehicle, like 90 mph.

In a simple mode the number of occurrences of speeding events is counted per a predefined period of time or distance. The number is used as extreme metric and is compared to the respective number related to other drivers whose driving risk is known, and a speeding event driving risk is associated to the driver of the vehicle. This speeding event driving risk can be weighted and merged with speed driving risk and/or acceleration driving risk to a total driving risk, especially for feedback to the driver.

In an enhanced method the number of speeding events is weighted with the severity of the individual speeding events. Further weighting factors may be used, as time of the day and/or area of occurrence. In general above mentioned actuarial parameter may be used as weighting factors. Further, the speeding events can be associated to travel segments—that can be done in the same manner as with acceleration events—and a travel segment speeding value can be derived. Such value can be further processed as an average speed per travel segment and/or average acceleration per travel segment, resulting in an extreme metric analogous to speed and/or acceleration metric.

In case of observation of a speeding event the frequency of sampling the vehicle speed as described above can be temporarily increased to better monitor the vehicle speed after the detected speeding event. The frequency can be random sampling as described above, a random factor being changed to increase random frequency of sampling.

In general, independent from the occurrence of speeding events, the frequency of sampling the vehicle speed can be increased upon observation of special events during the vehicle travel. Such observation can be a detection of a highway toll signal, like polling for an EZPass. Since such situations involve more dangerous situations than normal driving speeding events are more dangerous and can then be detected more reliable.

In the foregoing description of generation of the metrics in some details the mobile device 10 cooperates with the fixed device 14. However, the fixed device may be omitted, and the method steps described with the fixed device 14 are then performed by the mobile device, or may be omitted. The wording "mobile device 10" and "fixed device 14" may be replaced by "analyzing vehicle system 4".

Driver Performance Feedback Interface

Apart from the collection of data for the computation of insurance rates the method also aims at influencing the individual driver's behavior towards safer and less risky driving. Therefore the method does not stop at identifying hazardous speed and acceleration values but also provides a powerful feedback instrument that allows the driver to immediately assess his/her own performance.

The feedback method is based on a collected body of driving speed/acceleration/other metric data for drivers with good or bad performance. The speed and acceleration values, either per upload period or per area/time are statistically referenced to the number and/or severity of insurance events related to those values. In other words: The statistics gauges the risk for an insurance event for specific speed and acceleration values in certain locations/areas at certain times. The performance feedback Interface makes these references visible to the driver and shows his individual score within this risk matrix.

Figure 7:
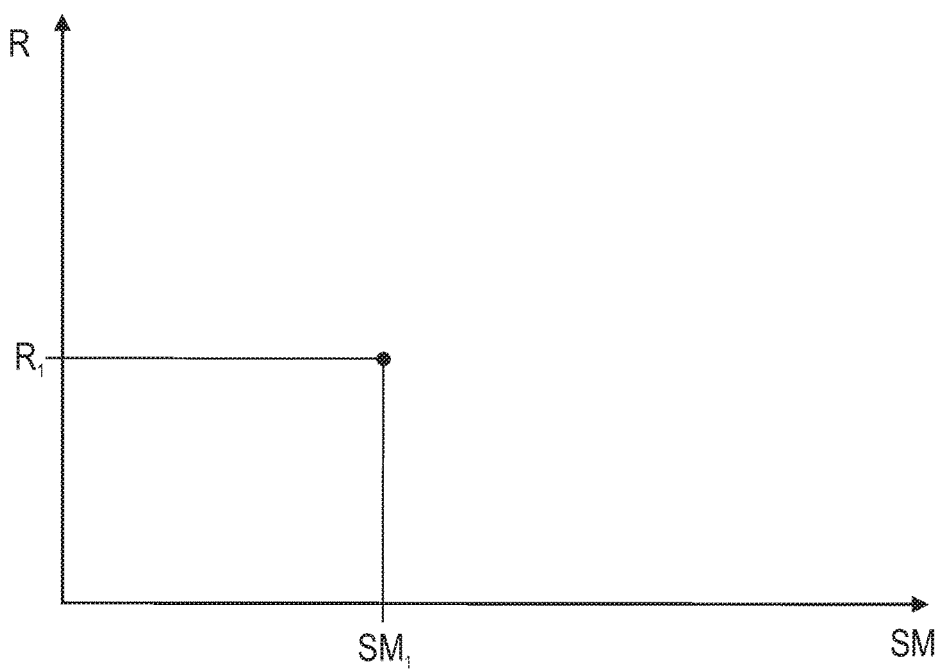
FIG. 7 shows a diagram with feedback information for the driver.

The feedback information can be displayed in the shape of a two dimensional "risk space". FIG. 7 shows such feedback diagram where risk R is depicted over speed metric SM. The risk value $R_1$ is the same as explained with FIG. 6, like risk zone 3, resulting in the following values: $R_1=3$, SM=+3 mph. This diagram shows to the driver how fast he was driving and how risky this driving was.

For further information the acceleration metric can be added as third dimension in a three dimensional "risk space" created by acceleration, speed and their respective risk values.

Each of these display modes can again be displayed for specific times of the day and specific actuarial areas. In this manner it becomes obvious for the driver when and in which environments his driving behavior shows potential for improvement. For example, the display could show him that his driving in the morning is quite safe and well within the green area of "good and approved driving" but that his speed and/or acceleration in the afternoon should be more controlled. Based on this basic framework of location and time this feedback system is quite expandable in the future with any complementary information that becomes available and may have relevance for the driving behavior such as traffic density and weather conditions. To further enhance the use of for remedial feedback, the insured party can request more frequent feedback from the stationary processing unit 6: "How am I doing?" to facilitate establishing the key "effort reward feedback cycle" central to driving behavior modification.

To further enhance the use of the system for remedial feedback, the insured party, which can be the driver of the vehicle or another person, like the vehicle holder or other authorized drivers, can request more frequent feedback from the system. For this the determination rate, e.g., sampling rate, of a parameter—like speed, acceleration, average speed, average acceleration, speed metrics and/or acceleration metrics—may be varied upon an input of the driver. With this variation the frequency of feedback to the driver may be varied according in predefined manner or in a manner chosen by the driver.

The feedback may be given by the mobile device 10, e.g. displayed in a smart phone. The feedback preferably includes one or both metrics, average speed and/or average acceleration, especially relative to other drivers or relative to a performance determined from data of other drivers.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof.

REFERENCE SYMBOLS 2 analyzing system
4 vehicle analyzing system
6 stationary processing unit
8 building
10 mobile device
12 vehicle
14 fixed device
16 processor
18 memory
20 location unit
22 communication means
24 remote communication means
26 battery
28 battery
30 motion detector
32 processor
34 memory
36 communication means
37 plug
38 plate
39 cover
40 app
41 Retrieval: Is vehicle moving?
42 Retrieval: Active analyzing app present?
44 Retrieval: Mobile ID encountered before?
46 Retrieval: Mobile device of the primary driver?
48 Copy data sets to the mobile device
50 Generate data sets
52 Copy data sets to the fixed device
54 Write data set
56 Write battery charge in data set
58 Terminate communication
60 Retrieval: Time for handshake?
62 Retrieval: App present?
64 Retrieval: Data capsule present?
66 Close communication
68 Create no-app data capsule
70 Record date, time, duration of movement
AP actuarial parameter
SM speed metric ASSL average statutory speed limit
SR speed reference

The invention claimed is:

1. A system for determining a driver operation characteristics, comprising an analyzing system in a vehicle, the analyzing system including a base device affixed to the vehicle and a mobile device location independent from the vehicle, and a stationary processing unit, and said analyzing vehicle system containing a program which, when executed, determines a traveling speed of the vehicle at a plurality of geographic locations, separates such speed data from location data where this speed was driven into different files containing either the location data or the respective speed data, wherein a separation is effected in a way that the direct correlation between speed data and corresponding location data is destroyed due to the separation.

2. The system according to claim 1, wherein:
said analyzing system contains a computer program which, when executed, determines a driver operation characteristics parameter;
said base device contains a program which, when executed, transmits the driver operation characteristics parameter to the mobile device; and
said mobile device contains a program which, when executed, receives the driver operation characteristics parameter from said base device.

3. The system according to claim 1, wherein said stationary processing unit contains a program which, when executed, receives a driver operation characteristics parameter from the mobile device and processes the driver operation characteristics parameter to determine the driver operation characteristic.

4. The system according to claim 1, wherein said base device contains an energy source and a motion detection means, a processor with attached memory and means for communicating wirelessly with the mobile device.

5. The system according to claim 1, wherein the mobile device contains a location unit for generating location data of the mobile device, at least one processor, a memory, a means to communicate wirelessly with the base device, a means to communicate wirelessly with the stationary processing unit and an energy source.

6. The system according to claim 1, wherein the analyzing vehicle system contains a program which when executed determines location data as position coordinates of the vehicle at random instants of time.

7. The system according to claim 1, wherein the analyzing vehicle system contains a program which when executed stores the position coordinates of the vehicle as entries in a file and randomizes the sequence of entries of the file.

8. The system according to claim 1, wherein the analyzing vehicle system contains a program which, when executed, sends both files to the stationary processing unit, wherein the stationary processing unit contains a program which, when executed, integrates a plurality of speed data of the speed data file over a travel segment into a superior speed value.

9. The system according to claim 1, wherein the analyzing vehicle system contains a program which, when executed, determines the travelling speed of the vehicle, generates speed data and stores them in a file, integrates a plurality of speed data over a travel segment into a superior speed value, and erases the individual speed values from the file after integration.

10. The system according to claim 1, wherein the analyzing vehicle system contains a program which, when executed, sends a superior speed value by the mobile device to the stationary processing unit.

11. The system according to claim 1, wherein the analyzing vehicle system contains a program which, when executed, calculates a plurality of travel segments from determined position coordinates and uploads them to the stationary processing unit.

12. The system according to claim 1, wherein the analyzing vehicle system contains a program which, when executed, integrates speed data of a travel segment into an average value over the travel segment, and repeats this procedure for a plurality of travel segments, wherein the stationary processing unit contains a program which when executed averages the average values of the travel segments resulting in an average area speed.

13. The system according to claim 1, wherein the stationary processing unit contains a program which, when executed, overlays trend lines received from the analyzing vehicle system on a digital road map to approximate mileage driven by the vehicle.

14. The system according to claim 13, wherein the stationary processing unit contains a program which, when executed, extracts from a data base a speed reference associated with each trend line, combines these speed reference into an average speed reference, compares the average speed reference with the average actual speed of the vehicle associated with the trend lines, and determines a delta between the two average speed values as driver operation characteristics.

15. The system according to claim 14, wherein the speed reference is the average speed of a plurality of vehicles at that point during that time of the day.

16. The system according to claim 14, wherein the speed reference is information on how fast the vehicle was allowed to drive on the respective roads associated with the trend lines.

17. The system according to claim 1, wherein the base device contains a motion detector with an acceleration sensor, and a program which, when executed, senses that the vehicle starts to move, wherein the motion detector operates in a stand-by mode keeping the acceleration sensor at work, wherein when the motion detector senses a movement of a car which is above a predefined motion threshold, it triggers a change from the standby mode to an active mode of the base device.

18. The system according to claim 1, wherein the base device contains a program which, when executed, triggers a start of the vehicle system upon vehicle motion and terminates the system upon a prolonged lack of such motion.

19. The system according to claim 18, wherein the base device contains a program which, when executed upon a detection of a vehicle movement prompts said base device to search in for an active analyzing app of the mobile device within the vicinity of its communication range.

20. A system for determining a driver operation characteristics, comprising:
an analyzing system in a vehicle, the analyzing system including a base device affixed to the vehicle and a mobile device location independent from the vehicle, and a stationary processing unit;
said stationary processing unit containing a program which, when executed, overlays trend lines received from said analyzing vehicle system on a digital road map to approximate mileage driven by the vehicle; and
said stationary processing unit containing a program which, when executed, extracts from a data base a speed reference associated with each trend line, combines the speed references into an average speed reference, compares the average speed reference with the average actual speed of the vehicle associated with the trend lines, and determines a delta between the two average speed values as driver operation characteristics.

* * * * *